United States Patent Office 2,754,285
Patented July 10, 1956

2,754,285

SUBSTITUTED INDANOL AND REACTION PRODUCT WITH HALOHYDRINS

John C. Petropoulos, South Norwalk, Conn., assignor to American Cyanamid Company, New York, N. Y., a corporation of Maine No Drawing. Application July 16, 1954, Serial No. 443,971

20 Claims. (Cl. 260—47)

This invention relates to a novel class of phenols and to the process of preparing the same. More specifically, this invention relates to a novel class of phenols having the general formula:

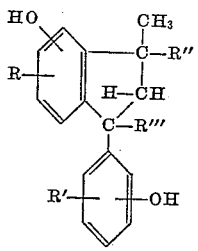

wherein R and R' are H or an alkyl group containing 1 to 4 carbon atoms; R" and R''' are alkyl groups containing 1 to 4 carbon atoms and to the process of preparing the same.

Still further, this invention relates to reaction products prepared by reacting a monoxy glycerol halohydrin such as epichlorohydrin with the novel phenols of the present invention and to the process of preparing the same.

One of the objects of the present invention is to produce a novel class of dihydric phenols. A further object of the present invention is to produce the condensation products of a monoxy glycerol halohydrin with the dihydric phenols of the present invention. These and other objects of the present invention will be discussed in greater detail hereinbelow.

The novel diphenols of the present invention are prepared by dimerizing a compound having the general formula:

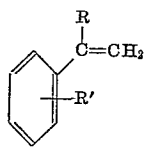

wherein R is an alkyl group containing from 1 to 4 carbon atoms, and R' is H, or an alkyl group containing from 1 to 4 carbon atoms.

The dimer thus produced is sulfonated by reacting said dimer with sulfuric acid, sulfur trioxide or a mixture of sulfur trioxide and sulfur dioxide and the like to form the sulfonated derivative of the dimer. The sulfonated product thus produced is salted out of solution by use of a suitable salting agent and recovering the sulfonated product from solution. The sulfonated product is then reacted in a fusion step with an alkaline material such as potassium hydroxide to produce the novel diphenols of the present invention.

The starting materials utilized in the preparation of the diphenols of the present invention are substituted styrenes having an alkyl group containing from 1 to 4 carbon atoms in the alpha position, and no substituent on the ring or an alkyl group having 1–4 carbon atoms on the ring. The alkyl group in the alpha position may be any one of methyl, ethyl, propyl, and butyl. The propyl group may be either n-propyl or isopropyl and the butyl group may be either n-butyl, isobutyl or tertiary butyl. One may use, for instance, α-methylstyrene, α-ethylstyrene, α-propylstyrene, α-butylstyrene and the like. The alkyl substituent on the ring may be in either the ortho, meta or para position. Representatives of the class of alkyl substituted styrenes which may be used in the practice of the process of the present invention are α,o-dimethylstyrene, α,m - dimethylstyrene, α,p - dimethylstyrene, α-ethyl, o-methylstyrene, α-ethyl, m-methylstyrene, α-ethyl, p-ethylstyrene, α-propyl, o-propylstyrene, α-propyl, m-butylstyrene, α-propyl, p-methylstyrene, α-butyl, o-methylstyrene, α-butyl, m-ethylstyrene, α-butyl, p-methylstyrene and the like. The alkyl substituent on the ring containing from 1 to 4 carbon atoms may be the sole substituent on the ring or it may be accompanied by other substituents such as other alkyl groups containing from 1 to 4 carbon atoms such as α-methyl, 2,4-dimethylstyrene and the like.

In order that the process for the preparation of the dimers utilized in the practice of the process of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as indicated in the appended claims.

DIMERIZATION OF α,p-DIMETHYLSTYRENE 800 parts of toluene cooled to 5° C. are introduced into a suitable reaction vessel. To the toluene, there is added 140 parts of a 95% sulfuric acid. The mixture is stirred thoroughly and maintained at a temperature of about 0–5° C. To the cooled mixture, there is added 260 parts of α,p-dimethylstyrene dissolved in 200 parts of toluene. The resulting mixture is allowed to react for ½ hour at 0–5° C. and is then hydrolyzed with 120 parts of water. The organic layer is washed free of acidic material, with water and is distilled to yield 250 parts of a colorless oil having a boiling point of 142–144° C. at 0.8 mm. This oil solidifies and has a melting point of 37–38° C. uncorrected.

DIMERIZATION OF α-ETHYL, p-METHYLSTYRENE

To 400 parts of toluene at 5° C., there is added slowly 70 parts of 95% sulfuric acid followed by 144 parts of α-ethyl, p-methylstyrene dissolved in 100 parts of toluene. The temperature is maintained at 0–10° C. during the entire addition. The resulting mixture is allowed to react for ½ hour and then is hydrolyzed with 100 parts of water. The organic material is collected, washed free of acidic material with water and distilled to yield 130 parts of a colorless liquid having a boiling point of 160–165° C. at 1 mm. 1-(4-methylphenyl)-1,3-diethyl-3,6 dimethylindane is produced.

DIMERIZATION OF α,META-DIMETHYLSTYRENE

To 200 parts of toluene at 0–5° C., there is added slowly 35 parts of 95% sulfuric acid, 65 parts of α,m-dimethylstyrene dissolved in 50 parts of toluene. The resulting mixture is allowed to react for about ½ hour and is then hydrolyzed with water. The organic material is collected, washed and distilled to yield 61 parts of a colorless liquid having a boiling point 144–148° C. at 1 mm. pressure. 1-(3-methylphenyl)-1,3,3,5 tetramethyl-indane is produced.

DIMERIZATION OF CRUDE α,p-DIMETHYLSTYRENE

To 368 parts of toluene at 10° C., there is added slowly 50 parts of anhydrous aluminum chloride followed by 516 parts of crude (undistilled) α,p-dimethylstyrene dissolved in 368 parts of toluene while maintaining the temperature below 10° C. After a 20 minute reaction time, the mixture is hydrolyzed with water and the organic layer is collected and dried. The organic material is distilled to give 150 parts of a colorless oil having a boiling point of 138–140° C. at 0.5–1 mm. 1-(4-methylphenyl)-1,3,3,6 tetramethyl-indane is produced.

DIMERIZATION OF α,p-DIMETHYLSTYRENE

A mixture of 310 parts of freshly distilled α,p-dimethylstyrene and 2 parts of p-toluene sulfonic acid are heated in a steam bath for about 16 hours and then allowed to react at room temperature for 2½ months, at which time the p-toluene sulfonic acid catalyst is removed by washing the organic layer with dilute sodium bicarbonate solution. Distillation of the organic layer gave 151 parts of a very light yellow colored oil having a boiling point of 136–140° C. at 1 mm. pressure. 1-(4-methylphenyl)-1,3,3,6 tetramethyl-indane is produced.

*Example 1.—Method for the preparation of 1-(3-hydroxy-4-methylphenyl)-1,3,3,6-tetramethyl-5-indanol*

Into a suitable reaction vessel equipped with thermometer and stirrer, there is introduced 250 parts of 1-(4-methylphenyl) - 1,3,3,6 - tetramethyl-indane. The charge is heated to about 50° C. and there is slowly added 450 parts of fuming sulfuric acid (15–18%). The reaction mixture is raised to about 100° C. at which time it is cooled and poured into a mixture of 1000 parts of concentrated hydrochloric acid and 500 parts of water. On cooling, needle-like crystals appear and are collected. The disulfonic acid crystals thus produced melt at about 100–104° C. and have a neutral equivalent of 239, indicating that the acid crystallizes with two molecules of water. The diacid produced had the following structure:

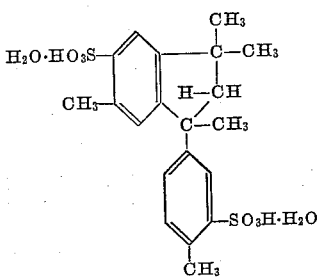

Into a suitable reaction vessel, there is introduced 700 parts of potassium hydroxide and 17 parts of water and the mixture is heated to about 300° C., whereupon there is added slowly 175 parts of the sulfonated product hereinabove produced. Some sulfur dioxide gas is evolved. The mixture is stirred and allowed to react further for about 1–2 hours at 325–340° C. After cooling, the fused mass is dissolved in water and acidified with hydrochloric acid causing a solid to precipitate. The solid material is collected and washed several times with a sodium bicarbonate solution which removed substantially all of the acid impurities. A crude diphenol having a melting point of 173° C. is obtained in an 80% yield and is further purified by recrystallization from methanol and water. This purification caused the melting point to raise to 178° C. The analysis calculated for $C_{20}H_{24}O_2$: was C, 81.04; H, 8.16; OH, 11.48. Found: C, 80.95; H, 8.12; OH, 11.46. The structure of the diphenol is as follows:

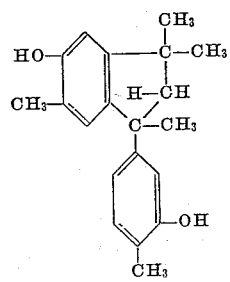

In carrying out the sulfonation step of the dimer of alpha methyl para methylstyrene, it is possible to operate under a rather wide range of temperatures such as between about 0° C. and 100° C. but preferably between about 15° C. and 50° C. In the salting out step, it is desired to utilize as low a temperature as possible while still in a liquid phase such as temperatures between about 0° C. and 30° C. As salting out agents, one can use in addition to hydrochloric acid, hydrobromic acid, sodium chloride, barium hydroxide and the like.

*Example 2.—Method for the preparation of 1-(4-hydroxy-3-methylphenyl)-1,3,3,5-tetramethyl-6-indanol*

To 200 parts of fuming sulfuric acid (15–18%), there is added slowly 100 parts of 1-(3-methylphenyl)-1,3,3,5-tetramethyl-indane. The temperature is controlled so as not to exceed about 30° C. by cooling on a water bath. At the end of the addition, the mixture is allowed to react for an additional ½ hour and then is added to concentrated hydrochloric acid solution. The disulfonic acid derivative which precipitates is cooled, washed free from sulfonic acid with hydrochloric acid and is dried. To 400 parts of potassium hydroxide maintained at 300° C., there is added slowly 100 parts of the disulfonic acid derivative thus produced. After the addition is completed, the temperature is raised to and maintained at 325° C. for ½ hour. After cooling, the mixture is dissolved in water and neutralized with Dry Ice. The diphenol thus produced is collected and purified by crystallization from heptane.

*Example 3.—Method of preparation of 1-(4-hydroxyphenyl)-1,3,3-trimethyl-5-indanol*

To 105 parts of fuming sulfuric acid (15–18%), there is added 50 parts of 1-(phenyl)-1,3,3-trimethyl-indane. The temperature is elevated to about 40° C. and controlled at that temperature by cooling on a water bath. At the end of the addition, the reaction is permitted to continue for an additional 30 minutes and the reaction mixture is then poured into concentrated hydrochloric acid. The disulfonic acid thus produced is precipitated, collected and washed free from sulfuric acid by the use of hydrochloric acid. The washed disulfonic acid is then dried. Into a separate reaction vessel equipped with thermometer, stirrer, and reflux condenser, there is introduced 300 parts of sodium hydroxide which is then heated to about 300° C. and to this charge, there is added slowly about 100 parts of the disulfonic acid thus produced. When the addition is completed, the temperature is raised to and maintained at about 325° C. for 30 minutes. After cooling, the reaction mixture is dissolved in water and neutralized with solid carbon dioxide. The 1-(4-hydroxyphenyl)-1,3,3-trimethyl-5-indanol which forms is collected and purified by crystallization from a methanol/water solution.

*Example 4.—Method for the preparation of 1-(3-hydroxy-4-methylphenyl)-1,3-diethyl-3,6-dimethyl-5-indanol*

Into a suitable reaction vessel equipped with thermometer, and stirrer, there is introduced 90 parts of fuming sulfuric acid (15–18%) and there is added thereto at a slow rate, 50 parts of 1-(4-methylphenyl)-1,3-diethyl- 3,6-dimethyl-indane. The temperature is elevated to about 70° C. and maintained at that temperature after the addition is completed for approximately ½ hour. The reaction mixture is then poured into a solution of concentrated hydrochloric acid. The disulfonic acid thus produced is collected after precipitation, washed free from sulfuric acid with hydrochloric acid, and is then dried. Into a separate reaction vessel equipped as indicated hereinabove, there is introduced 600 parts of potassium hydroxide which is heated to 325–335° C. While at this temperature, there is added slowly to the sphere of reaction 100 parts of disulfonic acid thus produced. After the addition is completed, the temperature is maintained at about 335° C. for ½ hour. The mixture is then cooled, dissolved in water and neutralized. The 1-(3-hydroxy-4-methylphenyl)-1,3-diethyl-3,6-dimethyl-5-indanol is collected and purified by crystallization from heptane.

*Example 5.—Preparation of 1 - (4 - hydroxy-3 - methylphenyl)-1,3-diethyl-3,5-dimethyl-6-indanol*

Into a suitable reaction vessel equipped as in Example 1, there is introduced 90 parts of fuming sulfuric acid and 50 parts of 1-(3-methylphenyl)-1,3-diethyl-3,5 - dimethylindane. The temperature is prevented from exceeding 30° C. by cooling on a water bath. At the end of the addition, the mixture is allowed to react for an additional ½ hour and is then poured into concentrated hydrochloric acid. The disulfonic acid thus produced is precipitated, collected and washed with hydrochloric acid in order to eliminate the sulfuric acid, and is then dried. To a suitable reaction vessel equipped with thermometer, stirrer and reflux condenser, there is added 650 parts of potassium hydroxide and the temperature is raised to about 310–330° C. The the sphere of reaction, there is added slowly 100 parts of the disulfonic acid thus produced. After the addition is completed, the reaction is permitted to continue at the same temperature for about ½ hour whereupon the reaction mixture is cooled, dissolved in water and neutralized with Dry Ice. The 1-(4-hydroxy - 3 - methylphenyl - 1,3-diethyl - 3,5- dimethyl - 6 - indanol is collected and purified by crystallization from heptane.

*Example 6.—Method for the preparation of 1-(4-hydroxyphenyl)-1,3-diethyl-3-methyl-5-indanol*

Into a suitable reaction vessel, 100 parts of fuming sulfuric acid (15–18%) are introduced and to the sphere of reaction, there is added slowly 50 parts of 1-(phenyl)-1,3-diethyl-3-methyl-indane. The temperature is raised to about 40° C. and is maintained at that temperature after the addition has been completed and is permitted to react for an additional 30 minutes. Thereupon, the charge is poured into concentrated hydrochloric acid and the sulfonic acid which precipitated is collected and washed free from sulfuric acid and is dried. Into a suitable reaction vessel equipped with stirrer, thermometer and reflux condenser, there is introduced 400 parts of potassium hydroxide and 300 parts of sodium hydroxide. When the temperature of the charge has been raised to 320–330° C., there is added slowly 100 parts of the disulfonic acid thus produced. After the addition is completed, the reaction mixture is maintained at about 330° C. for ½ hour. The mixture is then cooled, dissolved in water and neutralized with Dry Ice. The 1 - (4-hydroxyphenyl) - 1,3 - diethyl - 3 - methyl - 5 - indanol is collected and purified by crystallization from a methanol/water mixture.

Amongst the dihydric phenols which may be prepared in accordance with the process of the present invention are 1 - (3 - hydroxy - 4 - methylphenyl) - 1,3,3,6-tetramethyl - 5 - indanol; 1 - (2 - hydroxy - 4 - methylphenyl) - 1,3,3,6 - tetramethyl-4-indanol; 1-(3-hydroxy-4-methylphenyl) - 1,3,3,6 - tetramethyl - 7 - indanol; 1-(2 - hydroxyphenyl) - 1,3,3 - trimethyl - 5 - indanol; 1-(3-hydroxyphenyl)-1,3,3 - trimethyl - 5 - indanol; 1-(4-hydroxyphenyl)-1,3,3, - trimethyl - 5 - indanol; 1 - (3-hydroxy - 4 - ethylphenyl) - 6 - ethyl-1,3,3 - trimethyl-5 - indanol; 1 - (3-hydroxy - 4 - ethylphenyl) - 1,3,6-triethyl - 3 - methyl - 5 - indanol; 1 - (3 - hydroxy - 4-propylphenyl) - 3 - methyl-1,3,6-tripropyl - 5 - indanol; 1-(3 - hydroxy - 4 - butylphenyl) - 1,3,6 - tributyl - 3-methyl - 5 - indanol; 1-(4 - hydroxy - 3 - ethylphenyl)-1,3,6 - triethyl - 3 - methyl - 5 - indanol; 1 - (4-hydroxy-3-propylphenyl) - 1,3,6 - tripropyl-3-methyl-5-indanol.

To prepare the phenols of the present invention, one may alternatively ring chlorinate the indanes and hydrolyze the chlorinated indanes to produce the corresponding indanols.

The dihydric phenols of the present invention find utility in the preparation of resinous materials by reacting said diphenols with a monoxy glycerol halohydrin. Amongst the monoxy glycerol halohydrins which may be used in the practice of the process of the present invention are the epihalohydrins such as epichlorohydrin, epibromohydrin, epiiodohydrin, and epifluorohydrin. Still further, one may make use of the the $\alpha,\alpha'$ dihalohydrins, such as the $\alpha,\alpha'$ dichlorohydrin, $\alpha,\alpha'$ dibromohydrin, $\alpha,\alpha'$ diiodohydrin and $\alpha,\alpha'$ difluorohydrin. Of these halohydrins, epichlorohydrin is preferred. As a second choice, $\alpha,\alpha'$ dichlorohydrin may be used. In order to illustrate a method for the preparation of an epoxide resin utilizing a dihydric phenol of the present invention, the following examples are set forth in which all parts are parts by weight. These examples are set forth primarily for the purpose of illustration and any specific enumeration of detail contained therein should not be interpreted as a limitation on the case except as indicated in the appended claims.

*Example 7*

Into a suitable reaction vessel equipped with stirrer, thermometer and reflux condenser, there is introduced 237 parts of the dihydroxy phenol prepared according to Example 1, 44 parts of sodium hydroxide and 360 parts of water. The charge is heated to about 50° C. and there is added rapidly thereto 92.5 parts of epichlorohydrin. The mixture is then heated to and maintained at reflux temperature for approximately 2 hours at which time a taffy-like resinous solid which precipitated in the early stages of the reaction is collected and washed with boiling water until the water washings are substantially neutral to litmus paper. The white mass thus produced is then fused at 175–200° C. in order to remove the occluded water. The transparent pale green colored resin has a softening point of 142° C. (ball and ring method) is soluble in aromatic solvents and has a viscosity of $Z_3$–$Z_4$ at 60% solids in xylol at 25° C. on the Gardner-Holdt scale.

*Comparative Example 8*

The preceding example is repeated in every detail except in the place of the dihydroxy phenol of Example 1 being used, there is substituted an equivalent amount of 4,4' isopropylidene diphenol. The resin thus produced has a softening point of 92° C. (ball and ring method); is insoluble in aromatic solvents such as xylol but is soluble in oxygenated solvents such as Cellosolve acetate, methyl ethyl ketone and the like.

The resin prepared according to Example 7 was compared with the resin prepared according to Example 8 and with a commercially available epoxide resin (a condensate of 4,4' isopropylidene diphenol and epichlorohydrin in white baking enamel in combination with a urea-formaldehyde condensate. The pigment ($TiO_2$)/binder ratio was 0.9/1.0. The composition of the binder was 70% epoxide resin and 30% urea resin. Films from each of these three resin coating compositions were knifed on steel plates and were baked for 20 minutes at 400° F. A comparison of the observed film properties in these enamels is indicated in the following table, wherein A is the resin of Example 7; B, Example 8 and C, the commercially available resin.

TABLE 1

| Resin | A | B | C |
| --- | --- | --- | --- |
| Initial Color | Excellent | Fair | Fair. |
| Initial Gloss | ---do--- | ---do--- | Do |
| Color retention on overbake | ---do--- | Very Poor | Very Poor. |
| Gloss retention on overbake | ---do--- | Poor | Poor. |
| Impact Resistance | Fair | Excellent | Excellent. |
| Iodine Resistance | Excellent | Good | Good. |
| Resistance to Xylol | ---do--- | Excellent | Excellent. |
| Resistance to 50% aqueous acetic acid | ---do--- | Fair | Fair. |
| Resistance to 5% caustic solution | ---do--- | Excellent | Excellent. |
| Resistance to yellowing in hot soap solution | ---do--- | Poor | Poor. |
| Adhesion | ---do--- | Excellent | Excellent. |
| Resistance to cratering | ---do--- | Fair | Fair. |
| Epoxide Resin Compatibility with Alkyds | ---do--- | Limited | Limited. |

*Example 9*

Into a suitable reaction vessel equipped with stirrer, thermometer and reflux condenser, there is introduced 237 parts of 1-(4-hydroxy-3-methylphenyl)-1,3,3,5-tetramethyl-6-indanol, 44 parts of sodium hydroxide and 360 parts of water. The charge is heated to about 50° C. and there is added rapidly thereto 92.5 parts of epichlorohydrin. The mixture is then heated to and maintained at reflux temperature for approximately 2 hours, at which time the resinous solid which precipitated in the course of the reaction is collected and washed with boiling water until the water washings are substantially neutral to litmus paper. The resulting resin was heated to 150–200° C. to remove occluded water and was soluble in xylol and a 60% solids solution thereof in xylol had a viscosity of $Z_1$–$Z_4$ on the Gardner-Holdt scale at 25° C.

*Example 10*

Into a suitable reaction vessel equipped as in Example 7, there is introduced 268 parts of 1-(4-hydroxyphenyl)-1,3,3-trimethyl-5-indanol, 53 parts of sodium hydroxide and 480 parts of water. The charge is heated to about 53° C. and there is added rapidly thereto 111 parts of epichlorohydrin. The reaction is then continued as in Example 7.

*Example 11*

Into a suitable reaction vessel equipped as in Example 7, there is introduced 324 parts of 1-(3-hydroxy-4-methylphenyl)-1,3-diethyl-3,6-dimethyl-5-indanol, 176 parts of sodium hydroxide and 1600 parts of water. The charge is heated to about 50° C. and there is added rapidly thereto 250 parts of alpha, alpha' dichloro glycerol hydrin. The general procedure outlined in Example 7 is continued and the resin is finally dehydrated at 125° C.–150° C.

*Example 12*

Into a suitable reaction vessel equipped as in Example 7, there is introduced 324 parts of 1-(4-hydroxy-3-methylphenyl)-1,3-diethyl-3,5-dimethyl-6-indanol, 82 parts of potassium hydroxide and 750 parts of water. The charge is heated up to about 50° C., whereupon there is added rapidly thereto 123 parts of epichlorohydrin. The procedure according to Example 7 is then continued.

*Example 13*

Into a suitable reaction vessel equipped as in Example 7, there is introduced 296 parts of 1-(4-hydroxyphenyl)-1,3-diethyl-3-methyl-5-indanol, 51 parts of sodium hydroxide and 450 parts of water. The charge is heated to about 50° C., whereupon there is added rapidly thereto 108 parts of epichlorohydrin. The procedure according to Example 7 is continued to completion.

In the preparation of the resinous condensates of the present invention, one may use mol ratios of the novel dihydric phenols to the halohydrins ranging between 1:0.5 and 1:6, respectively, and preferably 1:1 to 1:4, respectively. In carrying out the dihydric phenol halohydrin reaction process, it is desired to maintain the sphere of reaction under alkaline conditions by the use of a suitable alkalizing material such as sodium hydroxide, potassium hydroxide, ammonium hydroxide and the like. The alkaline material is used in order to neutralize the halogen acid released in the course of the reaction.

The resinous materials of the present invention may be reacted with polyamines such as 1,2-diamino ethane, 1,3-diamino propane, 1,4-diamino-n-butane, 1,5-diamino-n-pentane, 1,6-diamino-n-hexane, 1,10-diamino-n-decane, 1,6-diamino-3-methyl-n-hexane and the like. Amongst the polyalkylene polyamines which may be used in the preparation of the resin with the difunctional halohydrins are diethylene triamine, triethylene tetramine, tetraethylene pentamine, polypropylene polyamines such as di-3-amino-propylamine, pentaethylene hexamine and the like.

The dihydric phenol halohydrin reaction products may be further reacted by esterification of the aliphatic hydroxy groups therein with long chain aliphatic acids such as those derived from glyceride oils. Amongst the fatty acids which may be reacted with the epoxy resinous materials are caproic, caprylic, capric, lauric, myristic, palmitic, stearic, arachidic, behenic, lignoceric, myristoleic, palmitoleic, oleic, linolenic, linoleic, elaeostearic, licanic, ricinoleic, erucic and the like.

The reaction product of the dihydric phenols and halohydrins may be reacted with polycarboxylic acids in order to form a complex alkyd resin. Amongst the polycarboxylic acids that may be used are the unsaturated alpha, beta polycarboxylic acids such as maleic, fumaric, aconitic, itaconic, and the like. Whenever available, the anhydrides of these acids may be used or mixtures of these acids, and/or their anhydrides may be used. Additionally one may make use of polycarboxylic acids which are free from non-benzenoid unsaturation such as phthalic, oxalic, malonic, succinic, glutaric, sebacic, adipic, pimelic, subaric, azelic, tricarballylic, citric, tartaric, malic and the like. Whenever available, the anhydrides of these acids may be used. These acids or their anhydrides may be used singly or in combination with one another. Also polycarboxylic acids prepared by reacting vinyl monomers such as styrene, substituted styrenes, acrylates, methacrylates and the like with alpha, beta unsaturated, mono and polycarboxylic acids such as acrylic acid, methacrylic acid, maleic anhydride and the like may be used.

The epoxy resins of the present invention may be mixed or reacted with a substantial plurality of natural and synthetic resinous materials. They may be blended by heating, but mutual solvents or by other means with one or more of the following: natural resins such as kauri, rosin, damar, or natural resin derivatives such as ester gum, hydrogenated rosin, Congo glycolide, ethyl abietate and the like, drying oils such as linseed, china wood and the like, cellulose derivatives such as nitrocellulose, cellulose acetate, cellulose propionate, cellulose acetobutyrate, ethyl cellulose, benzyl cellulose and the like, synthetic resins such as alkyd resins, unsaturated polyester resins, aminoplast resins, either alcohol modified or non-alcohol modified such as the urea-formaldehyde resins, melamine-formaldehyde resins, benzoguanamine-formaldehyde resins, dicyandiamide-formaldehyde resins and the like or the phenolic resins such as phenol-formaldehyde resins, either alcohol-modified or oil-modified or unmodified or the vinyl resins such as polystyrenes, polyvinyl acetate, polyvinyl chloride, polyacrylonitrile, and the like or polymer-captan resins, polyamides, polysulphonamides and the like.

To these epoxy resins either alone or with any of the above substances, one may add pigments, films, plasticizers, solvents, lubricants, promoters, catalysts, accelerators, driers and the like when and as needed.

The epoxy resins of the present invention will find wide application in such fields as adhesives, coating resins, laminates, castings, moldings, pottings and the like.

The present application is a continuation-in-part of my earlier filed application, having the Serial No. 414,860, filed March 8, 1954, entitled "Novel Compositions of Matter and Processes of Preparing Same." More specifically, it relates to a process comprising dimerizing substituted styrenes and oxidizing the dimer to a novel class of dicarboxylic acids.

I claim:

1. A process for preparing

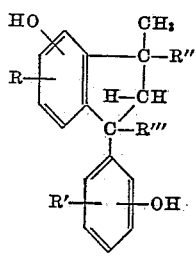

wherein R and R' are members selected from the group consisting of hydrogen, and an alkyl group containing from 1 to 4 carbon atoms and wherein R" and R''' are an alkyl group containing from 1 to 4 carbon atoms, comprising sulfonating

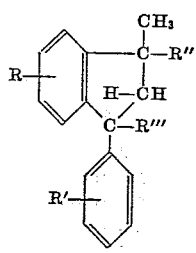

wherein R and R' are members selected from the group consisting of hydrogen and an alkyl group containing from 1 to 4 carbon atoms and R" and R''' are an alkyl group containing from 1 to 4 carbon atoms, to form

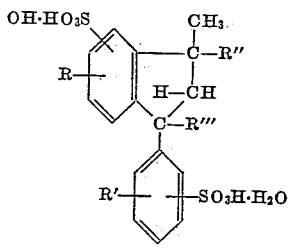

wherein R and R' are members selected from the group consisting of hydrogen and an alkyl group containing from 1 to 4 carbon atoms; R" and R''' are an alkyl group containing from 1 to 4 carbon atoms, and fusing said sulfonated compound with an alkaline material.

2. A process for preparing

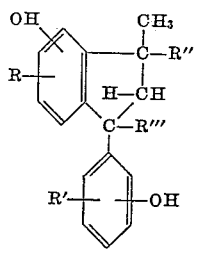

wherein R and R' are members selected from the group consisting of hydrogen and an alkyl group containing from 1 to 4 carbon atoms and wherein R" and R''' are alkyl groups containing from 1 to 4 carbon atoms comprising sulfonating

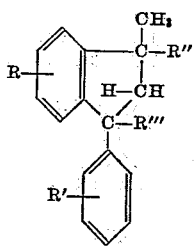

wherein R and R' are members selected from the group consisting of hydrogen and an alkyl group containing from 1 to 4 carbon atoms and wherein R" and R''' are alkyl groups containing from 1 to 4 carbon atoms with sulfuric acid to form

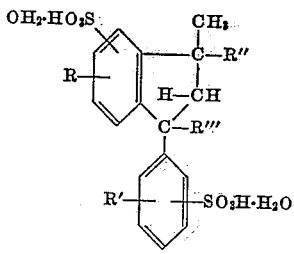

wherein R and R' are members selected from the group consisting of hydrogen and an alkyl group containing from 1 to 4 carbon atoms and wherein R" and R''' are alkyl groups containing from 1 to 4 carbon atoms and fusing said sulfonated compound with an alkaline material.

3. A process for preparing

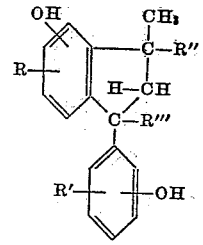

wherein R and R' are members selected from the group consisting of hydrogen and an alkyl group containing from 1 to 4 carbon atoms and wherein R" and R''' are alkyl groups containing from 1 to 4 carbon atoms comprising sulfonating

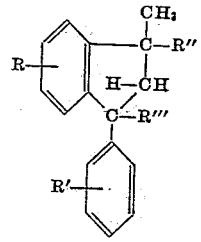

wherein R and R' are members selected from the group consisting of hydrogen and an alkyl group containing from 1 to 4 carbon atoms and wherein R" and R''' are alkyl groups containing from 1 to 4 carbon atoms with sulfuric acid to form

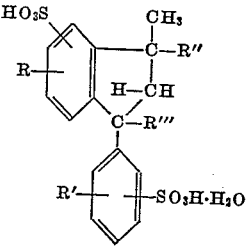

wherein R and R' are members selected from the group consisting of hydrogen and an alkyl group containing from 1 to 4 carbon atoms and wherein R'' and R''' are alkyl groups containing from 1 to 4 carbon atoms salting out and fusing said sulfonated compound with an alkaline material.

4. A process for preparing 1-(3-hydroxy-4-methylphenyl)-1,3,3,6-tetramethyl-5-indanol comprising sulfonating 1-(4-methylphenyl)-1,3,3,6-tetramethyl-indane and fusing said sulfonated compound with an alkaline material.

5. A process for preparing 1-(3-hydroxy-4-methylphenyl)-1,3,3,6-tetramethyl-5-indanol comprising sulfonating 1-(4-methylphenyl)-1,3,3,6-tetramethyl-indane with sulfuric acid and fusing said sulfonated compound with an alkaline material.

6. A process for preparing 1-(3-hydroxy-4-methylphenyl)-1,3,3,6-tetramethyl-5-indanol comprising sulfonating 1-(4-methylphenyl)-1,3,3,6-tetramethyl-indane with sulfuric acid, salting out and fusing said sulfonated compound with an alkaline material.

7.

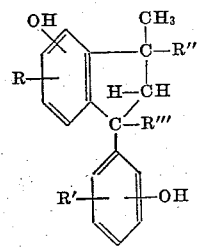

wherein R and R are members selected from the group consisting of hydrogen and an alkyl group containing from 1 to 4 carbon atoms and wherein R'' and R''' are alkyl groups containing from 1 to 4 carbon atoms.

8. 1-(3-hydroxy-4-methylphenyl)-1,3,3,6 - tetramethyl-5-indanol.

9. 1-(4-hydroxyphenyl)-1,3,3-trimethyl-5-indanol.

10. 1-(4-hydroxyphenyl)-1,3,3-trimethyl-6-indanol.

11. 1-(3-methyl-4-hydroxyphenyl) - 1,3,3,5 - tetramethyl-6-indanol.

12. 1-(2-methyl-5-hydroxyphenyl)-1,3,3,5 - tetramethyl-6-indanol.

13. A process comprising reacting, in an alkaline medium, a monoxy glycerol halohydrin with

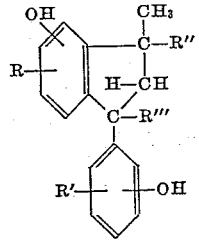

wherein R and R' are members selected from the group consisting of hydrogen and an alkyl group containing from 1 to 4 carbon atoms and wherein R'' and R''' are alkyl groups containing from 1 to 4 carbon atoms.

14. A process comprising reacting, in an alkaline medium, a monoxy glycerol halohydrin with 1-(3-hydroxy-4-methylphenyl)-1,3,3,6-tetramethyl-5-indanol.

15. A reaction product of a monoxy glycerol halohydrin and

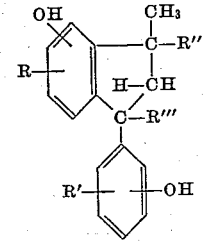

wherein R and R' are members selected from the group consisting of hydrogen and an alkyl group containing from 1 to 4 carbon atoms and wherein R'' and R''' are alkyl groups containing from 1 to 4 carbon atoms.

16. A reaction product of a monoxy glycerol halohydrin and 1-(3-hydroxy-4-methylphenyl)-1,3,3,6-tetramethyl-5-indanol.

17. A process comprising reacting, in an alkaline medium, epichlorohydrin with

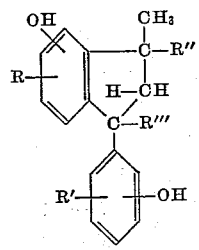

wherein R and R' are members selected from the group consisting of hydrogen and an alkyl group containing from 1 to 4 carbon atoms and wherein R'' and R''' are alkyl groups containing from 1 to 4 carbon atoms.

18. A process comprising reacting, in an alkaline medium epichlorohydrin with 1-(3-hydroxy-4-methylphenyl)-1,3,3,6-tetramethyl-5-indanol.

19. A reaction product of epichlorohydrin and

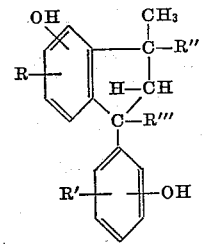

wherein R and R' are members selected from the group consisting of hydrogen and an alkyl group containing from 1 to 4 carbon atoms and wherein R'' and R''' are alkyl groups containing from 1 to 4 carbon atoms.

20. A reaction product of epichlorohydrin and 1-(3-hydroxy-4-methylphenyl)-1,3,3,6-tetramethyl-5 - indanol.

References Cited in the file of this patent

UNITED STATES PATENTS 2,493,730   Solmssen _____ Jan. 3, 1950